(12) United States Patent
Moreau et al.

(10) Patent No.: US 6,613,375 B2
(45) Date of Patent: Sep. 2, 2003

(54) CULINARY PRODUCT WITH CREAMING POWDER

(75) Inventors: Jean Moreau, Beauvais (FR); Sophie Monnois, Velennes (FR)

(73) Assignee: Nestec S.A., Vevey (CH)

(*) Notice: Subject to any disclaimer, the term of this patent is extended or adjusted under 35 U.S.C. 154(b) by 480 days.

(21) Appl. No.: 09/730,539

(22) Filed: Dec. 7, 2000

(65) Prior Publication Data

US 2001/0026833 A1 Oct. 4, 2001

(30) Foreign Application Priority Data

Dec. 10, 1999 (EP) .............................. 99204244

(51) Int. Cl.⁷ ....................... A23L 1/311; A23L 1/0522; A23L 1/39
(52) U.S. Cl. ....................... 426/578; 426/589
(58) Field of Search ................ 426/658, 589, 426/615, 641, 646, 519, 578

(56) References Cited

U.S. PATENT DOCUMENTS 4,088,792 A  5/1978  Bracco ................ 426/250
4,671,966 A  6/1987  Giddey et al. .......... 426/589
4,717,578 A * 1/1988  Biller et al. ............ 426/589

FOREIGN PATENT DOCUMENTS

| EP | 0 792 587 A2 | 9/1997 |
| EP | 0 832 566 A2 | 4/1998 |
| GB | 2 220 125 A | 1/1990 |
| JP | 63-007757 | 6/1986 |
| JP | 63-267250 | 11/1988 |
| JP | 10-327822 | 12/1998 |
| WO | WO 98/31240 | 7/1998 |
| WO | WO 98/48639 | 11/1998 |

* cited by examiner

Primary Examiner—Keith Hendricks
(74) Attorney, Agent, or Firm—Winston & Strawn

(57) ABSTRACT

The invention relates to a food product with creaming power, without emulsifiers, obtained by high-shearing mechanical treatment of a mixture of water, fat, pregelatinized swollen starch, and vegetable or animal pulp. The food product has a creamy unctuous consistency and may be frozen. The frozen product is stable to freezing/thawing and heating. The invention also relates to a process for the preparing the food product.

20 Claims, No Drawings

CULINARY PRODUCT WITH CREAMING POWDER

FIELD OF THE INVENTION

The present invention is directed to a culinary product with creaming power that exhibits high stability when subject to industrial and/or home freezing/thawing and/or heating processes. The invention is also directed to the process for manufacturing the culinary product.

BACKGROUND OF THE INVENTION

EP 0173646 describes a thickening food product provided in a form that can be divided into portions in the sterilized state. The process for manufacturing the product involves preparing a roux by sterilizing a mixture of fat and starchy product, wherein the starch is not pregelatinized, and then homogenizing the roux with a sufficient quantity of sterile water.

EP 832566 describes a sauce based on cheese and starch and a process to manufacture the sauce. In the process the ingredients are homogenized at a temperature less than the temperature for gelatinization of starch.

JP 63007757 describes a method for manufacturing a creamy emulsion having good heat resistance. The emulsion contains an emulsifier and a freezing agent.

GB 2220125 describes a deep-frozen creamy product consisting of a starch-containing aqueous phase and a dispersed fatty phase. The product contains at least one freezing point depressant and one water activity depressant and the size of the fat particles is set at a maximum of 10 microns.

JP 63267250 describes a process for manufacturing a sauce by high pressure homogenization of a mixture containing starch and fat but requiring emulsifiers to confer good stability on the product.

WO 9848639 describes a method of reducing calories and/or fat in a food product by applying a sudden and brutal variation in pressure to the food product. The aim and result of the process are different and far removed from the production of a creamy product.

WO 9831240 describes a process for preparing a texturing agent composed of a mixture of starch, water, and protein. The mixture is heated to gelatinize the starch and at least partially denature the proteins. The resulting mixture is then subjected to a mechanical treatment to reduce the size of the particles. The process does not use fat and does not involve an emulsion. Indeed, it is a problem to ensure the stability of mixtures when they include fat.

Until now, creamy and/or unctuous food/culinary products of the sauce or cream type were obtained using flavoring and texturing ingredients such as butter, creme fraiche, eggs, cheese and the like. The use of such ingredients results in sauces that have a rich and unctuous texture and a high fat content. The production cost of the ingredients, however, is high. Moreover nutritional considerations have made it desirable to try and reduce the amount of fat by replacing it, in part, with substitutes such as modified starches and other hydrocolloids that have organoleptic properties similar to fat. Moreover, emulsifiers are often added in order to facilitate the emulsification of oil-in-water or water-in-oil type sauces and to confer increased stability on them.

Furthermore, during various industrial and/or home technological treatments such as freezing, thawing, and heating, traditional products (i.e., those with a high content of fat of the butter and/or cream type) do not have sufficient stability and syneresis, precipitation, and aggregation can occur which are not acceptable to consumers who use the products. Accordingly, by reducing in the quantity and quality of the fat, using modified starches, and, in particular, using dietary emulsifiers and surfactants it is possible to partially remedy such defects.

SUMMARY OF THE INVENTION

The invention relates to a process for manufacturing a food product with creaming power. The process involves combining pregelatinized starch, fat, water and vegetable or animal pulp without added emulsifiers to provide a mixture; and subjecting the mixture to at least one high-shearing mechanical treatment at a homogenization pressure of about 150 to 600 bar to provide a food product having a fluid and unctuous texture.

The starch may be a modified starch and the process may further include freezing the food product. The freezing may be conducted simultaneously with the high-shearing mechanical treatment or after the high-shearing mechanical treatment.

The fat may be present in an amount of about 1 to 25 percent by weight, the pregelatinized starch in an amount of about 2.5 to 14 percent by weight, and the vegetable or animal pulp in an amount of up to about 55 percent weight. The process may further include the step of adding to the mixture one or more of non-fat milk solids in an amount up to about 10 percent by weight, egg white or yolk solids in an amount up to about 5 percent by weight, or cheese in an amount up to about 40% by weight or one or more of proteins in an amount up to about 20 percent by weight, fibers in an amount up to about 10 percent by weight, or minerals in an amount of up to about 2 percent by weight. The protein may be one or more of caseins, serum proteins, proteins of leguminous plants, or plant protein isolates and the fibers may be one or more of inulin, oligofructose, or vegetable meal.

The water contained in the food product may be added in a first amount before the high-shearing mechanical treatment and in a second amount after the high-shearing mechanical treatment. All or part of the water may be replaced with one or more other aqueous based fluids.

The fat may be one or more of groundnut oil, sunflower oil, olive oil, palm oil, butter oil, butter, or margarine and the starch may be one or more starches obtained from wheat, maize, potato, yam, cassava, or rice. The plant pulp may be obtained from one or more of carrots, onions, tomatoes, green beans, sweet peppers, mushrooms, maize seeds, cabbage, broad beans, apples, pears, grain, nuts, or hazelnuts and the animal pulp may be obtained from one or more of beef, lamb, pork, ham, chicken, anchovy, salmon, or sardine.

The invention further relates to a food product prepared according to the method of the invention. The food product may have a degree of overrun of about 40 to 120 percent.

DETAILED DESCRIPTION OF THE PREFERRED EMBODIMENTS

The present invention provides a process for manufacturing a culinary or food product with creaming power using inexpensive basic ingredients such as oil, vegetable or animal pulp, starch, and water, whose fat content is reduced compared with similar standard products. The food product of the invention exhibits improved stability to freezing/thawing and/or heating and the product does not include emulsifying agents and/or other emulsion stabilizers.

The phrase "improved stability to freezing/thawing and/or heating," as used herein means that there is no texture modification and that the emulsion is stable after several freezing/thawing cycles or heating/cooling cycles.

The phrase "emulsifying agents and/or other emulsion stabilizers," as used herein means any material that can be added to a mixture of two immiscible liquids to form a stable dispersion of the one liquid in the second immiscible liquid. Representative emulsifiers include, for example, mono and diglycerides and fatty acids esters.

The phrase "creaming power," as used herein means that the product shows a texture, thickness, and, in particular, mouthfeel, similar to a product containing fat in an amount of about 40 to 50 percent and, in particular, when the fat is in the form of one or more of butter, cream, egg, or cheese. Typically, with the culinary product of the invention this creaming power can be obtained with a fat or oil content as low as about 5 to 6 percent.

The process for manufacturing a culinary product with creaming power involves subjecting a mixture of pregelatinized and/or swollen starch, vegetable or animal pulp, fat, and water to at least one high-shearing mechanical treatment until an unctuous and creamy texture is obtained. The product of the invention is a homogeneous matrix without any visible or mouth-perceptible particles; the fat is perfectly emulsified and stabilized by the pregelatinized starch and fibere resulting from vegetable or animal pulp (in particular vegetable pulp obtained from ground vegetables). The matrix and viscosity are similar to those obtained using classical culinary ingredients such as cream and butter. Products containing classical culinary ingredients such as cream and butter, however, are very sensitive to heat and very unstable upon industrial and domestic treatments such as heating, cooling, reheating, microwaving, and the like.

The phrase "high shearing mechanical treatment," as used herein means treatment that subjects the mixture to shearing, i.e., stress resulting from dynamic forces such as high spin and high pressure created by mechanical action, at a homogenization pressure of between about 150 and 600 bar.

The "phrase pregelatinized starch," as used herein means starch that has been preheated in an aqueous medium and dried so that it will form a gel upon rehydration in cold water.

The phrase "swollen starch," as used herein means starch granules that have been swollen by water infiltration or penetration so that the granule is sensitive to mechanical treatment.

The invention also relates to a culinary product with creaming power obtained by the process of the invention. Typically, the food product comprises about 1 to 25% fat, preferably about 5 to 10% fat, and more preferably about 6 to 8% fat; about 2.5 to 14% starch, preferably about 3 to 12% starch, and more preferably about 4 to 9% starch; and up to about 55% vegetable or animal pulp, preferably up to about 50% vegetable or animal pulp, and more preferably up to about 45% vegetable or animal pulp.

The culinary product as defined above, may be in a frozen state. When the culinary product is frozen, the pregelatinized and/or swollen starch used for its preparation is a modified starch.

The term "modified starch," as used herein means a cross-linked and/or stabilized starch. The phrase "cross-linked starch," as used herein means that the lateral chains of starch polymer are linked together with a chemical cross linking agent. The term "stabilized starch," as used herein means that the starch is less sensitive to retrogradation.

In the process of the invention, it is possible to prepare the vegetable or animal pulp/water/oil/starch mixture and to treat it at a temperature of about 80° C. to 120° C., preferably about 90° C. to 110° C., and most preferably for about 95° C. to 105° C. for a sufficient time, i.e., about 30 seconds to 10 minutes, preferably about 45 seconds to 7 minutes, and more preferably about 1 to 5 minutes, in order to gelatinize the starch and then to apply to this mixture the high-shearing treatment. It is also possible to use a dehydrated pregelatinized starch. When dehydrated pregelatinized starch is used the four basic ingredients (water, oil, starch, vegetable and/or animal pulp) are mixed at room temperature for a sufficient time to allow the dehydrated starch to swell and regain the water lost during the dehydration.

The shearing has a substantial impact of on the denaturation of the starch gel. The more intense the shearing, the greater the loss of viscosity of the treated mixture. The final texture of the product depends on the intensity of the shearing that is applied. Therefore, it is possible to pass from a pasty, thick, and sticky product to a fluid and creamy product having a particularly unctuous mouth feel by varying the intensity of the shearing. Typically, pressure is used for shearing (i.e., a homogenizer) and the pressure is instantaneously applied; the shearing intensity is then varied by varying the applied pressure (i.e., from about 150 to 600 bars). For example, with an intermediate shearing intensity, it is possible to obtain a gummy product which is more or less supple and plastic that resembles cheese.

It is also possible to add only a portion of the water expected in the final product before the high-shearing treatment and to then add the remaining water after the high-shearing treatment so as to adjust the viscosity to a desired value. For example the initial amount of water may be about 2 to 15 percent, preferably from about 5 to 10 percent. The final product may contain more than about 20 percent water, preferably more than about 30 percent water. The final product may contain, for example, from about 20 to 90 percent water, preferably about 35 to 80 percent water, more preferably about 30 to 70 percent water.

The fat may be any dietary animal or vegetable oil including, but not limited to, a groundnut, sunflower, olive, palm, or butter oil; a fat which is solid but malleable at room temperature such as, for example, butter or margarine; or mixtures thereof. One of ordinary skill in the art will readily recognize fats that can be used in the process of the invention.

The starch may be obtained from any dietary starchy material. Preferably, the starch is obtained from a cereal such as wheat or maize; a tuber vegetable such as potato, yam, or cassava; or rice. One of ordinary skill in the art will readily recognize starches that can be used in the process of the invention.

The pregelatinized starch may be a native or chemically or physically modified starch which has been pregelatinized or precooked and/or swollen in boiling water before being added to the composition of the final product. It is also possible to use a native or chemically or physically modified starch which has been subjected to pregelatinization or precooking followed by dehydration.

The phrase "chemically or physically modified starch," as used herein means starch that has been modified by cross linking or by the addition of functional chemical groups (chemically modified) or starch that has been heat and/or pressure treated in order to improve hydration (physically modified).

The product according to the invention comprises, in weight percent about 1 to 25% fat, about 2.5 to 14% starch, with the water content being adjusted accordingly. The product may further comprise, as a percent of the total weight, up to about 10% of non-fat milk solids, up to about 55% of vegetable or animal pulp, and up to about 5% of egg white or yolk. The product may also contain other ingredients such as spices, salt, or sugar for example. One of ordinary skill in the art may readily determined the amounts of these other ingredients without undue experimentation.

The product of the invention may also be supplemented with proteins of animal and/or plant origin, soluble and/or insoluble fibers, or minerals to provide a creamy, velvety product that is a more nutritious product. The proteins may be added in the form of caseins, serum proteins, proteins of leguminous plants, or plant protein isolates, for example. The fibres may be provided directly by addition of inulin and/or of oligofructose, for example, or indirectly by the addition of vegetable meal such as lupin meal, for example. The quantity of added proteins may be up to about 20% of the total weight. The quantity of added fibers may be up to about 10% of the total weight and the quantity of added minerals may be up to about 2% of the total weight.

The process of the invention involves intimately mixing the basic ingredients of water, vegetable and/or animal pulp, fat, and pregelatinized starch to form a thick, compact, very viscous mass. The viscosity of the mixture of basic ingredients is close to that of a thick pudding dough and is typically too viscous to accurately determine the viscosity with a viscosity measuring device. This mixture is then subjected to high-shear treatment corresponding to a homogenization pressure of from about 150 to 600 bar. The viscosity of the mixture after high shear is typically about 1000 to 4000 cPs, preferably about 1500 to 3500 cPs, and most preferably about 2000 to 3000 cPs. The high-shear treatment may be obtained, for example, by using a twin screw extruder of the BC 21 type (commercially available from Clextral Inc. of Tampa, Fla.), a piston homogenizer (commercially available from APV Consolidated Inc of Des Plaines, Ill.), a high-pressure homogenizer of the ALM type (commercially available from Pierre Guerin SA of France) or any other similar equipment that is capable of applying a homogenization pressure that corresponds to a level of from about 150 to 600 bar.

The addition of vegetable or animal pulp makes it possible to obtain products with a rich texture that also have pleasant colors. The colors can be varied by varying the quantity and type of the vegetable or animal pulp that is used. Plant pulp that may be used in the process of the invention includes, but is not limited to, carrots, onions, tomatoes, green beans, sweet peppers, mushrooms, maize seeds, cabbage, broad beans, apples, pears, grain, nuts, hazelnuts, and the like. Animal pulp that may be used in the process of the invention includes, but is not limited to, finely minced or ground meat such as beef, lamb, pork, ham, chicken, and the like or finely minced or ground fish such as anchovy, salmon, and sardine.

The high-shearing mechanical treatment applied to a water/oil/pregelatinized starch/vegetable and/or animal pulp mixture modifies not only the texture of the mixture by converting it to a creamy and unctuous sauce, but also modifies the color. For example, when carrot pulp is used, the initial product has a typical "carrot orange" color that is converted to a yellow/pinkish sauce after high-shearing treatment. It is also surprising to note that the final product has lost the typical carrot taste. Accordingly, a wide range of colors may be obtained in the final product depending on the vegetable used and the oil/vegetable ratio that is chosen. Milk may also be added in order to modify the texture and color and to provide additional sweetness in the mouth, for example. Accordingly, apart from the unctuous and creamy texture acquired by means of the high-shearing process, a range of colors can be obtained such that it is possible to mix sauces of different colors to provide a sauce of a desired color without affecting the taste and/or the flavor of the sauce. Thus, it is possible to prepare sauces having a range of colors that can then be combined to create sauces having a practically unlimited range of colors. Indeed, the process of the invention, surprisingly, makes it possible to eliminate the taste of some of the ingredients used. Thus, it is possible to develop, regardless of the basic ingredients used, a base which is neutral from the taste point of view but whose color is defined by virtue of the choice of vegetable pulp and oil/vegetable pulp ratio. The base can then be flavored as desired.

Furthermore, it has been observed that the shearing effect is increased when the mixture is concentrated. Thus, it is advantageous to subject a concentrated mixture, i.e., a mixture wherein no additional water is added and the water is provided only by vegetable or animal pulp, to high shearing and to then adjust the viscosity of the sheared product to a desired value by means of a liquid such as water, wine, vinegar, or any other aqueous fluid. The phrase "aqueous fluid" as used herein means any fluid that has water as the major component.

The high-shearing mechanical treatment has several effects on the ingredients that effects the final texture of the product including: (a) a micro-grinding effect (in particular with the use of vegetable and/or animal pulp), (b) a high-shearing effect which causes the destruction of the starch granules and of the structure of the gel, and (c) a homogenization effect.

A particularly advantageous variation of the process of the invention involves subjecting the product to the high-shearing mechanical treatment at a freezing temperature so as to freeze the product at the same time as it is textured. Typically the freezing temperature is from about $-5°$ C. to $-20°$ C., preferably about $-3°$ C. to $-18°$ C., and most preferably about $-6°$ C. to $-10°$ C. The vegetable and/or animal pulp/water/oil/pregelatinized modified starch mixture may be treated, for example, with a homogenizing apparatus having high shearing power, such as a twin-screw extruder, that is cooled by means of a cooling fluid circulating in an external envelope. The cooling fluid may be, for example, alcohol at $-40°$ C. By treating the mixture at a freezing temperature, the product, under the combined effect of low temperature and the severe mixing/shearing during the transport inside the cylinder, changes to a product having a firm but malleable texture, that is easy to mold, whose temperature is of the order of about $-2°$ C. to $-10°$ C.

When manufacturing a creamy product that is frozen or which is intended to be frozen, the use of a cross-linked and/or stabilized starch is necessary in order to confer heat stability on the finished product and to avoid retrogradation, syneresis, and/or precipitation during the freezing/thawing and/or heating stages that the product will be subjected to. The term "retrogadation," as used herein, means the formation of an heterogeneous gel over time. The term "syneresis," as used herein, means expulsion of water and/or oil from the gel. The term "precipitation," as used herein, means the formation and appearance of solid particles. The freezing may be carried out concomitantly with the high-shearing treatment. Alternatively the freezing may be carried out after the high-shearing treatment by placing in series a device capable of ensuring a homogenization pressure greater than 150 bar followed by device capable of freezing the product.

Surprisingly, it is possible to obtain a creamy and unctuous texture with stabilized and/or cross-linked starches. Indeed, this type of additive is typically intended to confer firmness and a gelled texture to a product to which it is added. It appears, however, that the high-shearing mechanical treatment disorganizes the stabilized network so as to bring about fluidization of the product while still retaining a high stability with respect to retrogradation.

It is advantageous to be able to use large quantities of starch (i.e., up to 14%) as a replacement for expensive ingredients such as butter, eggs, cream, and the like and which are unusable in standard recipes and processes for the manufacture of sauces.

EXAMPLES

The invention is further defined by reference to the following examples describing in detail the preparation of the culinary product of the invention. The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. In these examples, the percentages are given by weight unless otherwise stated.

Example 1
Tomato Sauce.

| | | |
|---|---|---|
| Tomato sauce (370 Brix): | | 20% |
| Sunflower oil: | | 2% |
| Instant starch (Ultrasperce*): | | 4.5% |
| Salt: | | 0.5% |
| Sugar: | | 0.3% |
| Water: | balance to | 100% |

*a cross-linked starch commercially available from National Starch and Chemical Co. of Bridgewater, NJ The ingredients were stirred at a temperature of from about 15° C. to 30° C. (room temperature), for a period sufficient for the starch to swell by reabsorbing a quantity of water comparable to that which it had lost during dehydration after pregelatinization (about 30 min). Mechanical pretreatment with the aid of a shearing pump was carried out to facilitate pumping the mixture. The mixture was then homogenized with an ALM high-pressure homogenizer (commercially available from the Pierre Guerin SA of France) at room temperature. The desired viscosity was obtained by means of two successive homogenization with this apparatus. The resulting sauce had a fluid and creamy texture and a color which was more pinkish/orange than the product before shearing. The sauce can then be stirred slowly to carry out seasoning corrections and/or addition of solid or liquid ingredients, such as pieces of meat or fish.

The water/oil/starch/tomato sauce/salt/sugar thick mixture was also introduced into a double pass piston homogenizer operating at 500 bar (commercially available from the APV Consolidated Inc. of Des Plaines, Ill.) at room temperature. The resulting sauce was similar to the thawed product obtained by the extruder with cooling (see next paragraph). The fluid sauce had a brilliant white color and an unctuous texture in the mouth. The resulting sauce can be refrigerated or frozen according to conventional means, well known to those of ordinary skill in the art, for subsequent consumption and/or use.

The water/oil/starch/tomato sauce/salt/sugar thick mixture may be introduced into the inlet of a twin-screw extruder of the BC21 type (commercially available from the Clextral Inc. of Tampa, Fla.). The extruder was equipped with nine components allowing the freezing of the product by circulation of alcohol cooled at −40° C. The mixture leaves the apparatus in the form of a roll with a firm texture having a temperature of about −2.8° C. The mixture is easy to mold and has a brilliant white color. After thawing and heating, the color persists but the viscosity has disappeared and the product resembles a homogeneous fluid creme fraiche having an unctuous and stable mouth feel without any phase separation or syneresis.

Example 2

Carrot Puree.

| | | |
|---|---|---|
| Carrot pulp: | | 40% |
| Sunflower oil: | | 10% |
| Potato starch: | | 4.5% |
| Water | balance to | 100% |

The water/oil/starch mixture is cooked by heating, with stirring, to a temperature of 95° C. and maintained at 95° C. for 5 minutes to provide a base. The base is then cooled and mixed with the carrot pulp and the resulting mixture subjected to a high-shearing mechanical treatment using a high-pressure homogenizer of the type used in Example 1. After the high-shear treatment, the sauce has a creamy and unctuous appearance whose color is modified compared with the mixture before shearing. The high-sheared sauce is lighter than before the shearing treatment.

Example 3

Soup Supplemented with Proteins, Fibers and Calcium.

| | | |
|---|---|---|
| Onions/carrots/tomatoes: | | 35% |
| Sunflower oil: | | 6.5% |
| Maize starch: | | 4.5% |
| Powdered proteins (calcium caseinate, serum proteins, pea protein isolate, food yeast extract) | | 16% |
| Fibers (inulin, oligofructose) | | 4% |
| Mineral supplement calcium | | 1% |
| Water | balance to | 100% |

The ingredients were mixed in a manner identical to the method used in Example 2. The high-shear mechanical treatment was carried out in a similar manner using a double pass piston homogenizer operating at 500 bar (commercially available from APV Consolidated Inc. of Des Plaines, Ill.) at room temperature. The resulting sheared product had a consistency similar to a thick cream and can be diluted with water or milk in a ratio of one volume of liquid per two volumes of base to provide a velvety soup with an unctuous texture and having an optimum nutritional composition.

Example 4

Anchovy Butter.

| | |
|---|---|
| Margarine: | 7.5% |
| Butter: | 4% |
| Maize starch | 8% |
| Anchovy pulp | 15% |
| Tomato puree | 12% |
| Powdered egg white | 1% |
| Water balance to | 100% |

The ingredients were mixed in a manner similar to the preceding examples, at room temperature. The high-shear mechanical treatment was carried out in two stages; the first stage was carried out with a shearing pump and the second stage with a piston homogenizer of the type used in the preceding example.

In a similar manner, the high-shear mechanical treatment was carried out using a refrigerated extruder of the BC21 type. In this case, a cross-linked maize starch is used. The resulting product is spreadable at room temperature (after thawing if the product is frozen) and is similar to a conventional anchovy butter.

A variant of the process for manufacturing anchovy butter according to the present recipe involves including air during the mechanical treatment with the aid of the extruder so as to give the product a degree of overrun. The fatty and spreadable texture is improved by the inclusion of air.

Example 5

Peanut Butter.

| | | |
|---|---|---|
| Carrot pulp | | 28% |
| Roasted groundnut | | 20% |
| Concentrated apple puree: | | 20% |
| Hydrogenated vegetable fat | | 15% |
| Modified starch (Ultra Sperse 5)* (pregelatinized) | | 5.5% |
| Sugar | | 3.5% |
| Skimmed milk powder | | 3% |
| Coloring caramel | | 1% |
| Flavorings | | 0.7% |
| Fine salt | | 0.5% |
| Water | balance to | 100% |

*A cross-linked and stabilized starch marketed by the National Starch and Chemical Co. of Bridgewater, NJ.

The ingredients were continuously mixed with grinding re-circulation using a shearing pump and then subjected to the high-shearing mechanical treatment in two stages by means of a high-pressure homogenizer as in Example 1.

What is claimed is:

1. A process for manufacturing a food product with creaming power comprising:
   combining pregelatinized starch, fat, water and vegetable or animal pulp without added emulsifiers to provide a mixture; and
   subjecting the mixture to at least one high-shearing mechanical treatment at a homogenization pressure of about 150 to 600 bar to provide a food product having a fluid and unctuous texture.

2. The process of claim 1, wherein the starch is a modified starch and further comprising freezing the food product.

3. The process of claim 2, wherein the freezing is conducted simultaneously with the high-shearing mechanical treatment.

4. The process of claim 2, wherein the freezing is conducted after the high-shearing mechanical treatment.

5. The process of claim 1, wherein the mixture comprises fat in an amount of about 1 to 25 percent by weight, pregelatinized starch in an amount of about 2.5 to 14 percent by weight, and vegetable or animal pulp in an amount of up to about 55 percent weight.

6. The process of claim 5, further comprising adding to the mixture one or more of non-fat milk solids in an amount up to about 10 percent by weight, egg white or yolk solids in an amount up to about 5 percent by weight, or cheese in an amount up to about 40% by weight.

7. The process of claim 5, further comprising adding to the mixture one or more of proteins in an amount up to about 20 percent by weight, fibers in an amount up to about 10 percent by weight, or minerals in an amount of up to about 2 percent by weight.

8. The process of claim 7, wherein the protein comprises one or more of caseins, serum proteins, proteins of leguminous plants, or plant protein isolates and the fibers comprise one or more of inulin, oligofructose, or vegetable meal.

9. The process of claim 1, wherein the water contained in the food product is added in a first amount before the high-shearing mechanical treatment and in a second amount after the high-shearing mechanical treatment.

10. The process of claim 1, further comprising replacing part of or all of the water with one or more other aqueous based fluids.

11. The process of claim 1, wherein the fat comprises one or more of groundnut oil, sunflower oil, olive oil, palm oil, butter oil, butter, or margarine.

12. The process of claim 1, wherein the starch is one or more starches obtained from wheat, maize, potato, yam, cassava, or rice.

13. The process of claim 1, wherein the plant pulp is obtained from one or more of carrots, onions, tomatoes, green beans, sweet peppers, mushrooms, maize seeds, cabbage, broad beans, apples, pears, grain, nuts, or hazelnuts and the animal pulp is obtained from one or more of beef, lamb, pork, ham, chicken, anchovy, salmon, or sardine.

14. A food product with creaming power comprising fat in an amount of from about 1 to 25 percent by weight, pregelatinized starch in an amount of about 2.5 to 14 percent by weight, water, and vegetable or animal pulp in an amount of up to about 55 percent by weight without added emulsifiers, wherein the mixture has been subjected to at least one high-shearing mechanical treatment at a homogenization pressure of about 150 to 600 bar, such that the food product has a fluid and unctuous texture.

15. The food product of claim 14, wherein the pregelatinized starch is a modified starch, the food product is frozen, and the food product exhibits texture stability during thawing and/or heating.

16. The food product of claim 1, having a degree of overrun of about 40 to 120 percent.

17. The food product of claim 14, further comprising one or more of non-fat milk solids in an amount up to about 10 percent by weight, egg white or yolk solids in an amount up to about 5 percent by weight, or cheese in an amount up to about 40% by weight.

18. The food product of claim 14, further comprising one or more of proteins in an amount up to about 20 percent by weight, fibers in an amount up to about 10 percent by weight, or minerals in an amount of up to about 2 percent by weight.

19. The food product of claim 14, wherein the fat comprises one or more of groundnut oil, sunflower oil, olive oil, palm oil, butter oil, butter, or margarine and the starch is one or more starches obtained from wheat, maize, potato, yam, cassava, or rice.

20. The food product of claim 14, wherein the plant pulp is obtained from one or more of carrots, onions, tomatoes, green beans, sweet peppers, mushrooms, maize seeds, cabbage, broad beans, apples, pears, grain, nuts, or hazelnuts and the animal pulp is obtained from one or more of beef, lamb, pork, ham, chicken, anchovy, salmon, or sardine.

* * * * *

UNITED STATES PATENT AND TRADEMARK OFFICE
CERTIFICATE OF CORRECTION

PATENT NO.    : 6,613,375 B2
DATED         : September 2, 2003
INVENTOR(S)   : Moreau et al.

It is certified that error appears in the above-identified patent and that said Letters Patent is hereby corrected as shown below:

<u>Title page, Item [54] and Column 1, line 2,</u>
Change the title to -- CULINARY PRODUCT WITH CREAMING POWER --.

Signed and Sealed this

Twenty-eighth Day of October, 2003

JAMES E. ROGAN
*Director of the United States Patent and Trademark Office*